United States Patent [19]
Duncan

[11] Patent Number: 5,166,947
[45] Date of Patent: Nov. 24, 1992

[54] LASER CROSS-FLOW GAS SYSTEM
[75] Inventor: David B. Duncan, Auburn, Calif.
[73] Assignee: The United States of America as represented by the United States Department of Energy, Washington, D.C.
[21] Appl. No.: 915,202
[22] Filed: Sep. 29, 1986
[51] Int. Cl.[5] .............................................. H01S 3/22
[52] U.S. Cl. ...................................... 372/56; 372/59; 372/60
[58] Field of Search .......................... 372/56, 59, 60; 330/4.3

[56] References Cited
U.S. PATENT DOCUMENTS

| | | | |
|---|---|---|---|
| 3,643,175 | 2/1972 | Bhaumik et al. | 372/60 |
| 3,792,373 | 2/1974 | Altman et al. | 372/56 |
| 3,852,685 | 12/1974 | Ehrlich et al. | 330/4.3 X |
| 3,934,211 | 1/1976 | Sucov et al. | 330/4.3 X |
| 4,103,253 | 7/1978 | Tokudome et al. | 372/56 |
| 4,230,995 | 10/1980 | Burnham | 372/56 |
| 4,347,613 | 8/1982 | Pivirotto | 372/59 X |

Primary Examiner—Mark Hellner
Attorney, Agent, or Firm—Miguel A. Valdes; Henry P. Sartorio; William R. Moser

[57] ABSTRACT

A method and laser apparatus are disclosed which provide for a cross-flow of gas near one end of a laser discharge tube. The cross-flow of gas causes a concentration gradient which affects diffusion of contaminants in the discharge tube towards the cross-flow of the gas, which contaminants are then withdrawn from the discharge tube.

7 Claims, 1 Drawing Sheet

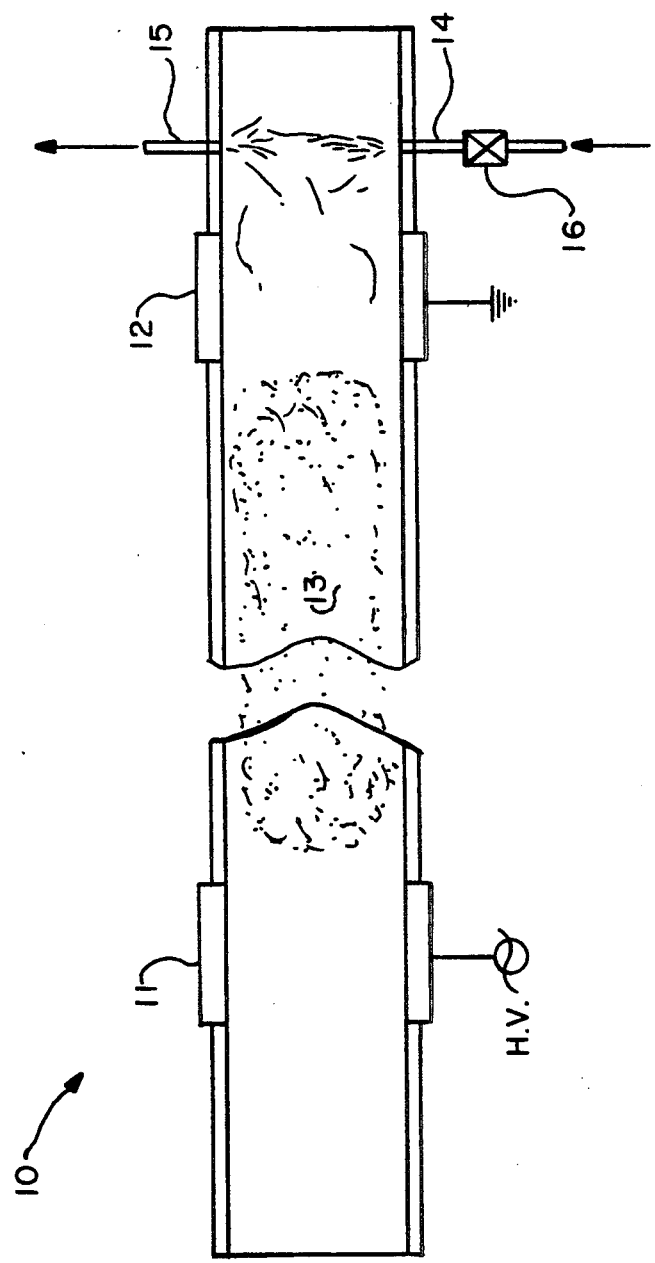

LASER CROSS-FLOW GAS SYSTEM

The United States Government has rights in this invention pursuant to Contract No. W-7405-ENG-48 between the United States Department of Energy and the University of California for operation of Lawrence Livermore National Laboratory.

FIELD OF THE INVENTION

The present invention is directed to a method and apparatus for removing contaminants from within the lasing chamber of a laser.

BACKGROUND OF THE INVENTION

In a typical electric discharge excited metal vapor laser, the efficiency of the laser is maximized by having only the metal vapor present within the lasing chamber. Even minute amounts of vapor contaminants can affect the laser efficiency. Sometimes unwanted discharges of the laser into the contaminant vapors occur and cause punctures in the walls of the laser. The contamination comes from various sources, such as from impurities in the solid metal used to form the vapor, outgassing from the walls of the laser chamber (typically made of alumina), and leaks through various openings and seals in the laser itself.

To deal with this contamination, some lasers are adapted to utilize the flow of an inert gas, such as neon or argon, through the lasing chamber to purge contaminants therefrom. This is done by having an inlet for the inert gas at one end of the laser and an outlet at the other end attached to a vacuum. Thus, the flow of the inert gas longitudinally through the lasing chamber purges contaminants from within the chamber, however, this also withdraws some of the metal vapor. This longitudinal flow of an inert gas through the lasing chamber thus causes the problem of depleting the metal vapor supply, thus requiring replenishment of the metal vapor more frequently than would otherwise be required. Also, the presence of a flowing inert gas through the lasing chamber could cause discharge of the laser through the gases due to the high voltages in the chamber (usually 50 kv or more) and possibly causing puncturing of the walls of the laser tube. A third problem is that, being that either the inlet or the outlet for the inert gas (usually the inlet) must be at the high voltage end of the laser, it is difficult to design the inlet tubes and gas regulators to have operational lifetimes in such high heat and energy environments commensurate with the other components of the laser.

SUMMARY OF THE INVENTION

It is an object of the present invention to provide a method for removing contaminants from the interior of a laser discharge chamber.

It is a further object of the present invention to provide a method for removing contaminants from the interior of a laser discharge chamber without introducing an inert gas into the lasing zone.

It is a further object of the present invention to provide a method for introducing a cross-flow of inert gas into one end of the lasing chamber at a location remote from the high voltage electrode.

Briefly, the present invention provides a method and apparatus for removing the contaminants from the interior of a laser discharge chamber during operation of the laser. The method comprises causing a cross-flow of inert gas at one of the chamber by introducing and withdrawing a gas in a direction crossing the longitudinal axis of the chamber whereby contaminants are drawn to the cross-flow and withdrawn from the chamber. Thus the apparatus of the present invention comprises a laser adapted with an inlet means and outlet means at one end, for respectively introducing into and withdrawing from the laser an inert gas. The inlet and outlet means are disposed to cause a cross-flow of the gas in a direction crossing the longitudinal axis of the laser.

Additional objects, advantages and novel features of the present invention will be set forth in part in the following description and in part will become apparent from those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWING

In the accompanying drawing, incorporated in and forming a part of the specification, there is illustrated a preferred embodiment of the invention. Together with the description, the drawing serves to explain the principles of the invention.

The FIGURE is a longitudinal cross-sectional view of the tubular laser structure for generating laser pulses where the structure includes at one end an inlet means and an outlet means for causing the cross-flow of gas in accordance with the present invention.

DETAILED DESCRIPTION OF THE PREFERRED EMBODIMENT

Reference will be made in detail to the preferred embodiments of the invention, an example of which is illustrated in the accompanying FIGURE. While the invention will be described in connection with the preferred embodiments, it will be understood that the invention is not limited thereto. Thus, to facilitate description of the invention, the following description is given in terms of a copper vapor laser (CVL), but it will be understood that the invention is directed to any metal vapor laser. The invention is intended to cover all alternatives, modifications and equivalents as may be included within the spirit and scope of the invention as defined herein and by the appended claims.

Referring to the FIGURE, there is shown a longitudinal cross-section of a typical metal vapor laser 10. For illustration purposes only the cutaway sections of each end of the laser are shown. The power to the laser is provided via two annular electrodes, 11 and 12, one of which, 11, is at a high voltage and the other of which, 12, is grounded. At some point, generally centrally located along the laser tube, there is an insulator, not shown, to separate the components at high voltage from those which are grounded. Between the electrodes 11 and 12 within the main bore of the laser is the hot zone (lasing zone) 13 wherein the metal vapor lasers. Distributed throughout the interior of the laser there may be contaminants such as impurities from the solid metal used to form the metal vapor, outgasses from the materials comprising the walls of the laser (usually alumina) and leakage from the outside atmosphere through the ends and seals of the laser. The ends of the laser during operation are sealed (not shown) with a material transparent to the laser beam.

To purge these contaminants from the interior of the laser, particularly during operation of the laser, a gas inlet 14 is disposed at one end of the laser. As shown, inlet 14 is located at the grounded end of the laser, which is preferable, although there is no particular requirement that it be located at the grounded end. However, if inlet 14 and outlet 15 are instead located at the high voltage end, there will be the additional problem of dealing with the heat and high voltage environment. Preferably, directly opposite inlet 14 on the laser wall is located gas outlet 15. Outlet 15 will be in communication with a vacuum producing means which withdraws the inert gas and contaminants. Inlet means 14 is adapted with a gas regulation means 16. The inert gas which is utilized may be typical inert gases such as argon and neon, with neon being the most preferable. While the flow rate of the gas which cross-flows across the longitudinal axis of the laser from inlet 14 to outlet 15 would depend on the particular conditions of the laser, i.e., the particular metal vapor which is utilized, the dimensions of the laser, and the like, the flow rate will typically be less than about 100 grams per square centimeter. Since typically, the vapor pressure of the metal vapor within t lasing zone 13 is very low (i.e., usually about $10^{-2}-10^0$ mm), the cross-flow of the inert gas is relatively large compared to the internal pressure of the laser. The cross-flow causes the contaminants which, within the vicinity to be influenced by the convection of the cross-flow are drawn into the cross-flow, and withdrawn through outlet 15 along with the inert gas. The withdrawal of the contaminants within the vicinity of the cross-flow of inert gas thus creates a concentration gradient of the contaminants within the laser, with the highest concentration of contaminants being at the opposite end of the laser (as shown, the high voltage end of the laser) and the lowest concentration of contaminants being at the cross-flow of the gases at the grounded end. Because of this concentration gradient, contaminants will diffuse toward the gaseous cross-flow, thereby providing a means for continuous withdrawal of contaminants from the laser, even while the laser is in operation, without substantial disruption of the lasing zone 13 and without unnecessarily exposing unwanted gaseous particles to high voltage and/or the lasing zone.

The foregoing description of the preferred embodiments of the invention is provided for purposes of illustration and description. It is not intended to be exhaustive or to limit the invention to the precise forms disclosed and obviously, many modifications and variations are possible in light of the above teachings. The embodiments were chosen and described in order to best explain the principles of the invention and their practical application to thereby enable others skilled in the art to best utilize the invention and the various embodiments, and with various modifications as are suited to the particular use contemplated and it is intended that the scope of the invention be defined by the claims appended hereto.

What is claimed is:

1. A method of removing contaminants from the interior of a metal vapor laser discharge chamber during operation of the laser, comprising the step of causing a cross-flow of gas at one end of said chamber by introducing an inert gas through an entry port in a direction crossing the longitudinal axis of said chamber and withdrawing gas from said laser through an exit port laterally opposed in said chamber to said entry port, whereby said contaminants are drawn into said cross-flow of gas and are withdrawn from said chamber.

2. A method according to claim 1 wherein said laser is a tubular shaped copper vapor laser and said gas comprises neon.

3. A method according to claim 2 wherein said cross-flow is at a rate of up to about 100 grams per square centimeter.

4. A method according to claim 1 wherein said gas is introduced and withdrawn from the grounded end of said laser.

5. In a metal vapor laser, the improvement comprising inlet means and outlet means at one end of said laser for, respectively, introducing into and withdrawing from said laser an inert gas, said inlet and outlet means laterally disposed to one another to cause a cross-flow of said gas in a direction crossing the longitudinal access of said laser.

6. A laser according to claim 5 wherein said laser is a tubular shaped copper vapor laser.

7. A laser according to claim 5 wherein said inlet means and outlet means are at the grounded end of said laser.

* * * * *